United States Patent
Ji et al.

(10) Patent No.: US 9,450,707 B2
(45) Date of Patent: Sep. 20, 2016

(54) LIMITED DUTY CYCLE FDD SYSTEM

(75) Inventors: Tingfang Ji, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 86 days.

(21) Appl. No.: 13/172,402

(22) Filed: Jun. 29, 2011

(65) Prior Publication Data

US 2012/0002578 A1 Jan. 5, 2012

Related U.S. Application Data

(60) Provisional application No. 61/360,073, filed on Jun. 30, 2010.

(51) Int. Cl.
*H04J 1/00* (2006.01)
*H04L 1/16* (2006.01)
(Continued)

(52) U.S. Cl.
CPC ............ *H04L 1/16* (2013.01); *H04L 1/1854* (2013.01); *H04W 72/1268* (2013.01)

(58) Field of Classification Search
CPC .................. H04W 72/0413; H04W 72/0406; H04W 72/042; H04W 72/04; H04W 24/10; H04W 72/1231; H04W 72/1268; H04W 72/1221; H04W 72/1242; H04W 72/1273; H04W 16/14; H04W 28/06; H04W 72/1215; H04W 72/1284
See application file for complete search history.

(56) References Cited

U.S. PATENT DOCUMENTS

2002/0136168 A1 9/2002 Struhsaker et al.
2008/0039131 A1* 2/2008 Kaminski et al. ............ 455/522
(Continued)

FOREIGN PATENT DOCUMENTS

CN 101689980 A 3/2010
EP 1746855 1/2007
(Continued)

OTHER PUBLICATIONS

CATT: "UL ACK/NACK Transmission Design in FDD with CA", 3GPP Draft; R1-100876, 3rd Generation Partnership Project (3GPP), Mobile Competence Centre ; 650, Route Des Lucioles ; F-06921 Sophia-Antipolis Cedex ; France, vol. RAN WG1, no. San Francisco, USA; Feb. 16, 2010, XP050418480, [retrieved on Feb. 26, 2010].

(Continued)

*Primary Examiner* — Chi H Pham
*Assistant Examiner* — Raul Rivas
(74) *Attorney, Agent, or Firm* — Patterson & Sheridan, LLP

(57) ABSTRACT

Acknowledgment bundling has been defined for Long Term Evolution (LTE) Time Division Duplex (TDD) systems due to asymmetric DL/UL partitioning. In the case of Frequency Division Duplex (FDD) with a limited uplink (UL) duty cycle, there may be asymmetry associated with a downlink transmission and an associated uplink acknowledgment. For example, there may be a physical downlink shared channel (PDSCH) and a physical uplink control channel (PUCCH) hybrid automatic repeat request acknowledgment (HARQ-ACK) asymmetry. Interference between downlink and uplink transmissions may be a factor contributing to the limited UL duty cycle in an FDD system. For an FDD system having a limited mobile transmission duty cycle, both DL and UL performance may be significantly degraded without proper mitigation techniques. According to certain embodiments of the present disclosure, various HARQ and scheduling techniques may be utilized for minimizing loss due to the limited UL duty cycle.

68 Claims, 9 Drawing Sheets

(51) Int. Cl.
*H04L 1/18* (2006.01)
*H04W 72/12* (2009.01)

(56) References Cited

U.S. PATENT DOCUMENTS

| | | | |
|---|---|---|---|
| 2008/0095252 A1* | 4/2008 | Kim et al. | 375/260 |
| 2009/0196204 A1 | 8/2009 | Astely et al. | |
| 2009/0323617 A1 | 12/2009 | Che et al. | |
| 2010/0067496 A1* | 3/2010 | Choi | 370/336 |
| 2010/0142466 A1 | 6/2010 | Palanki et al. | |
| 2010/0150085 A1* | 6/2010 | Ishii et al. | 370/329 |
| 2010/0150114 A1 | 6/2010 | Che | |
| 2010/0202396 A1 | 8/2010 | Won et al. | |
| 2011/0075611 A1 | 3/2011 | Choi | |
| 2011/0141878 A1 | 6/2011 | Che et al. | |
| 2012/0057545 A1* | 3/2012 | Hariharan et al. | 370/329 |

FOREIGN PATENT DOCUMENTS

| | | |
|---|---|---|
| KR | 20070011030 A | 1/2007 |
| KR | 100703287 B1 | 4/2007 |
| WO | WO-2009118621 A2 | 10/2009 |
| WO | 2009157859 A2 | 12/2009 |

OTHER PUBLICATIONS

International Search Report and Written Opinion—PCT/US2011/042685—ISA/EPO—Aug. 3, 2012.
Motorola: "Uplink ACK/NACK Transmission Format for Carrier Aggregation", 3GPP Draft; R1-103934, 3rd Generation Partnership Project (3GPP) , Mobile Competence Centre ; 650, Route Des Lucioles ; F-06921 Sophia-Anti Polis Cedex ; France, vol. RAN WG1, No. Dresden, Germany; Jun. 28, 2010, Jun. 22, 2018 (Jun. 22, 2010) , XP050449311, [retrieved on Jun. 22, 2010].
Nokia Siemens Networks et al., "UL control signalling for carrier aggregation", 3GPP Draft; R1-093905, 3rd Generation Partnership Project (3GPP), Mobile Competence Centre ; 650, Route Deslucioles ; F-06921 Sophia-Anti Polis Cedex ; France, no. Miyaraki; Oct. 12, 2009, XP050388408, [retrieved on Oct. 5, 2009].
NTT Docomo: "Uplink ACK/NACK Transmission Scheme on PUCCH for—LTE-Advanced", 3GPP Draft; R1-101209 UL ACK on PUCCH, 3rd Generation Partnership Project (3GPP) , Mobile Competence Centre ; 650, Route Deslucioles ; F-06921 Sophia-Anti Poll S Cedex ; France, vol . RAN WG1, no. San Francisco, USA; Feb. 22, 2010, Feb. 16, 2018 (Feb. 16, 2810), XP050418728, [retrieved on Feb. 16, 2018].
International Search Report and Written Opinion—PCT/US2011/042685—ISA/EPO—Mar. 7, 2012.
Nokia Siemens Networks, BS Demodulation Performance Requirements Analysis wrt. CA WI, 3GPP TSG-RAN WG4 Ad Hoc #2, R4-101164, Dublin, Ireland, Apr. 12-16, 2010, 4 pages, XP050427307.
IPWireless, Smart Scheduling for Dual Receiver UEs, 3GPP, RAN2 #56, R2-063326, XP050132809A, Nov. 6-10, 2006, Riga, Latvia, 5 pages.
Motorola, PDCCH Design for Carrier Aggregation and Post Rel-8 Features, 3GPP TSG RAN1 #58, R1-093417, XP050388131, Shenzhen, China, Aug. 24-26, 2009, 6 pages.
Invitation to Pay Additional Fees for PCT Patent Application Serial No. PCT/US2011/042685 dated Nov. 4, 2011.
Nokia Siemens Networks et al.,"ACK/NACK Bundling Details for LTE TDD", 3GPP Draft; R1-081858_LTE_TDD_AN_Bundling_All, 3rd Generation Partnership Project (3GPP), Mobile Competence Centre ; 650, Route Des Lucioles ; F-06921 Sophia-Antipolis Cedex ; France, vol. RAN WG1, no. Kansas City, USA; May 14, 2008, XP050110226.
LG Electronics: "UL ACK/NACK PUCCH design in LTE-Advanced", 3GPP TSG RAN WG1 #59bis R1-100215, Jan. 22, 2010, p. 1-p. 5, URL, http://www.3gpp.org/ftp/TSG_RAN/WG1_RL1/TSGR1_59b/Docs/R1-100215.zip.

\* cited by examiner

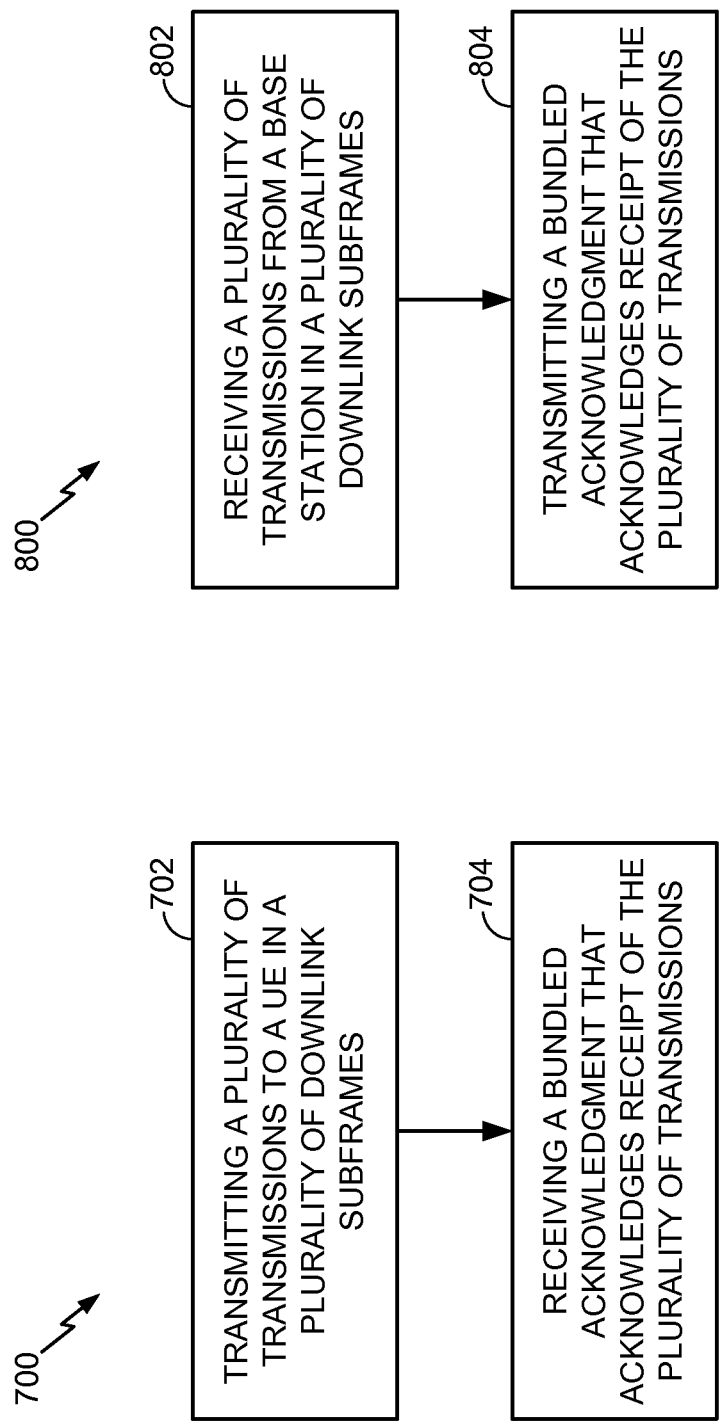

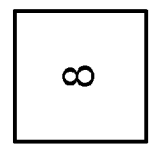
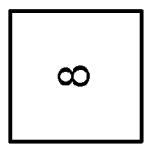
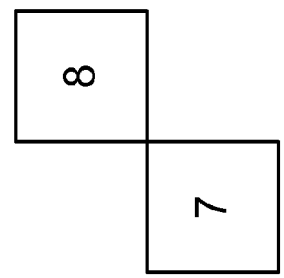
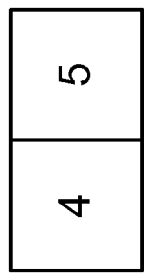
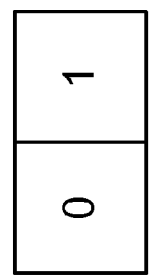
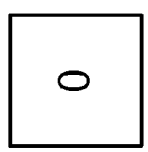
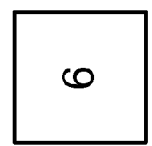
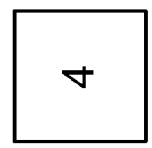
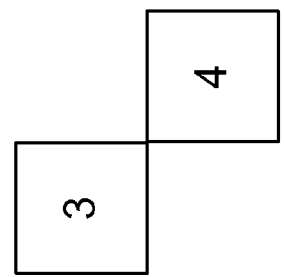
FIG. 10A
FIG. 10B
FIG. 10C

LIMITED DUTY CYCLE FDD SYSTEM

CROSS-REFERENCE TO RELATED APPLICATIONS

This application claims priority to U.S. Provisional Application Ser. No. 61/360,073, filed on Jun. 30, 2010, which is expressly incorporated by reference herein in its entirety.

BACKGROUND

I. Field

Certain aspects of the present disclosure generally relate to wireless communications and, more particularly, to a method for minimizing the loss due to a limited uplink duty cycle in a frequency division duplex (FDD) system.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels. Each of the NS independent channels corresponds to a dimension. The MIMO system can provide improved performance (e.g., higher throughput and/or greater reliability) if the additional dimensionalities created by the multiple transmit and receive antennas are utilized.

SUMMARY

Certain aspects of the present disclosure provide a method for frequency division duplex (FDD) wireless communications. The method generally includes configuring a plurality of user equipments (UEs) to transmit in accordance with a plurality of different uplink activity patterns, transmitting data to the UEs, and receiving acknowledgments from the plurality of UEs, wherein each acknowledgment is transmitted by a UE in accordance with its corresponding uplink activity pattern.

Certain aspects of the present disclosure provide an apparatus for FDD wireless communications. The apparatus generally includes means for configuring a plurality of UEs to transmit in accordance with a plurality of different uplink activity patterns, means for transmitting data to the UEs, and means for receiving acknowledgments from the plurality of UEs, wherein each acknowledgment is transmitted by a UE in accordance with its corresponding uplink activity pattern.

Certain aspects of the present disclosure provide an apparatus for FDD wireless communications. The apparatus generally includes at least one processor and a memory coupled to the at least one processor. The at least one processor is generally configured to configure a plurality of UEs to transmit in accordance with a plurality of different uplink activity patterns, transmit data to the UEs, and receive acknowledgments from the plurality of UEs, wherein each acknowledgment is transmitted by a UE in accordance with its corresponding uplink activity pattern.

Certain aspects of the present disclosure provide a computer-program product for FDD wireless communications. The computer-program product generally includes a computer-readable medium having code for configuring a plurality of UEs to transmit in accordance with a plurality of different uplink activity patterns, transmitting data to the UEs, and receiving acknowledgments from the plurality of UEs, wherein each acknowledgment is transmitted by a UE in accordance with its corresponding uplink activity pattern.

Certain aspects of the present disclosure provide a method for FDD wireless communications. The method generally includes transmitting a plurality of transmissions to a UE in a plurality of downlink subframes and receiving a bundled acknowledgment that acknowledges receipt of the plurality of transmissions.

Certain aspects of the present disclosure provide an apparatus for FDD wireless communications. The apparatus generally includes means for transmitting a plurality of transmissions to a UE in a plurality of downlink subframes and means for receiving a bundled acknowledgment that acknowledges receipt of the plurality of transmissions.

Certain aspects of the present disclosure provide an apparatus for FDD wireless communications. The apparatus generally includes at least one processor and a memory coupled to the at least one processor. The at least one processor is generally configured to transmit a plurality of transmissions to a UE in a plurality of downlink subframes and receive a bundled acknowledgment that acknowledges receipt of the plurality of transmissions.

Certain aspects of the present disclosure provide a computer-program product for FDD wireless communications. The computer-program product generally includes a computer-readable medium having code for transmitting a plurality of transmissions to a UE in a plurality of downlink subframes and receiving a bundled acknowledgment that acknowledges receipt of the plurality of transmissions.

Certain aspects of the present disclosure provide a method for FDD wireless communications. The method generally includes receiving a plurality of transmissions from a base station in a plurality of downlink subframes and transmitting a bundled acknowledgment that acknowledges receipt of the plurality of transmissions.

Certain aspects of the present disclosure provide an apparatus for FDD wireless communications. The apparatus generally includes means for receiving a plurality of transmissions from a base station in a plurality of downlink subframes and means for transmitting a bundled acknowledgment that acknowledges receipt of the plurality of transmissions.

Certain aspects of the present disclosure provide an apparatus for FDD wireless communications. The apparatus generally includes at least one processor and a memory coupled to the at least one processor. The at least one processor is generally configured to receive a plurality of transmissions from a base station in a plurality of downlink subframes and transmit a bundled acknowledgment that acknowledges receipt of the plurality of transmissions.

Certain aspects of the present disclosure provide a computer-program product for FDD wireless communications. The computer-program product generally includes a computer-readable medium having code for receiving a plurality of transmissions from a base station in a plurality of downlink subframes and transmitting a bundled acknowledgment that acknowledges receipt of the plurality of transmissions.

BRIEF DESCRIPTION OF THE DRAWINGS

FIG. 7 illustrates example operations for determining a fixed bundling pattern for a UE, in accordance with certain aspects of the present disclosure.

FIG. 8 illustrates example operations for transmitting a bundled acknowledgment for a plurality of downlink transmissions, in accordance with certain aspects of the present disclosure.

FIGS. 10A-C illustrate embodiments of an FDD system for DL and UL scheduling that may avoid self-interference, in accordance with certain aspects of the present disclosure.

DETAILED DESCRIPTION

Acknowledgment bundling has been defined for Long Term Evolution (LTE) Time Division Duplex (TDD) systems due to asymmetric DL/UL partitioning. In the case of Frequency Division Duplex (FDD) with a limited uplink (UL) duty cycle, there may be asymmetry associated with a downlink transmission and an associated uplink acknowledgment. For example, there may be a physical downlink shared channel (PDSCH) and a physical uplink control channel (PUCCH) hybrid automatic repeat request acknowledgment (HARQ-ACK) asymmetry. Interference between downlink and uplink transmissions may be a factor contributing to the limited UL duty cycle in an FDD system. For an FDD system having a limited mobile transmission duty cycle, both DL and UL performance may be significantly degraded without proper mitigation techniques. According to certain embodiments of the present disclosure, various HARQ and scheduling techniques may be utilized for minimizing loss due to the limited UL duty cycle.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
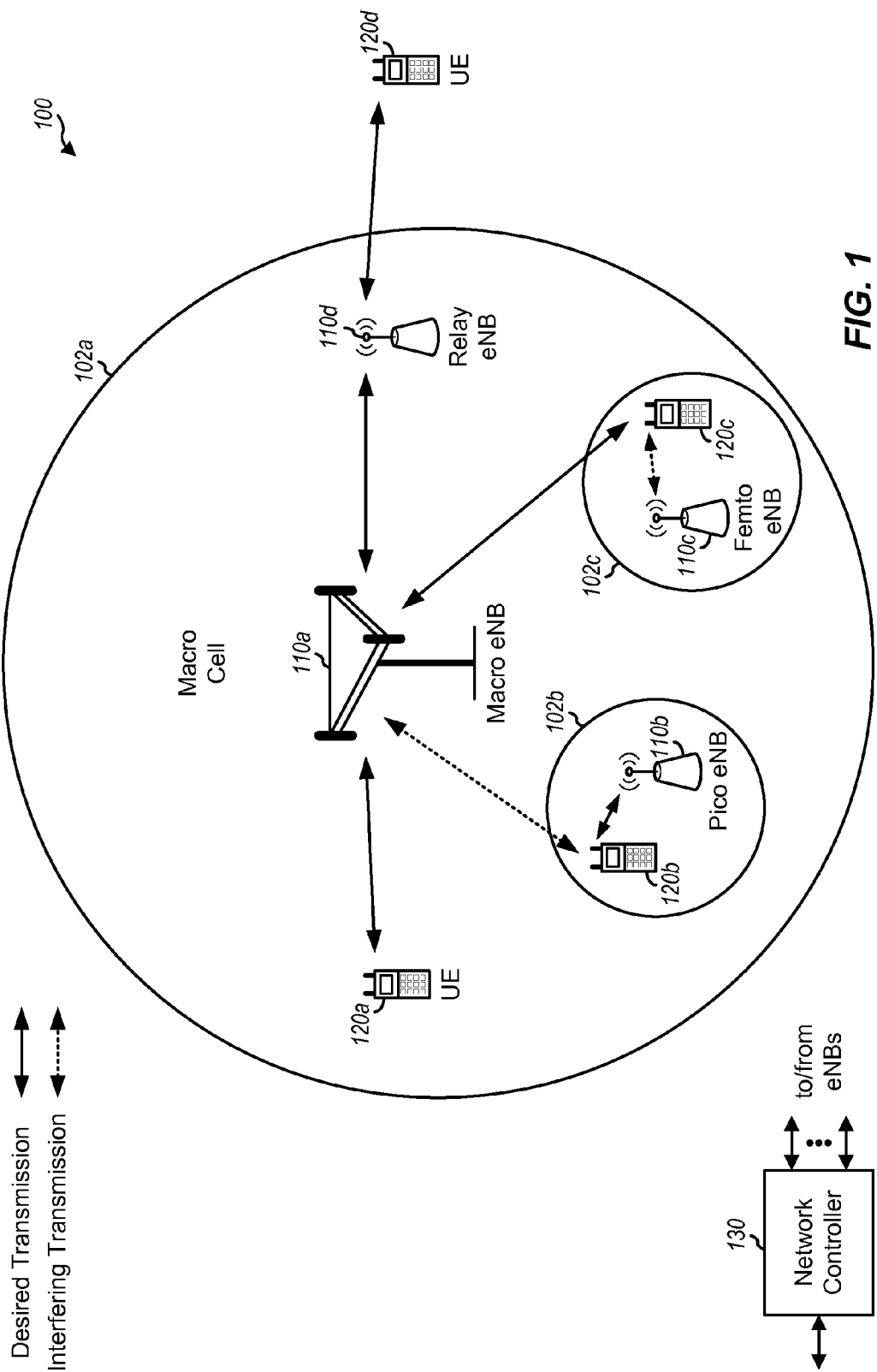
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
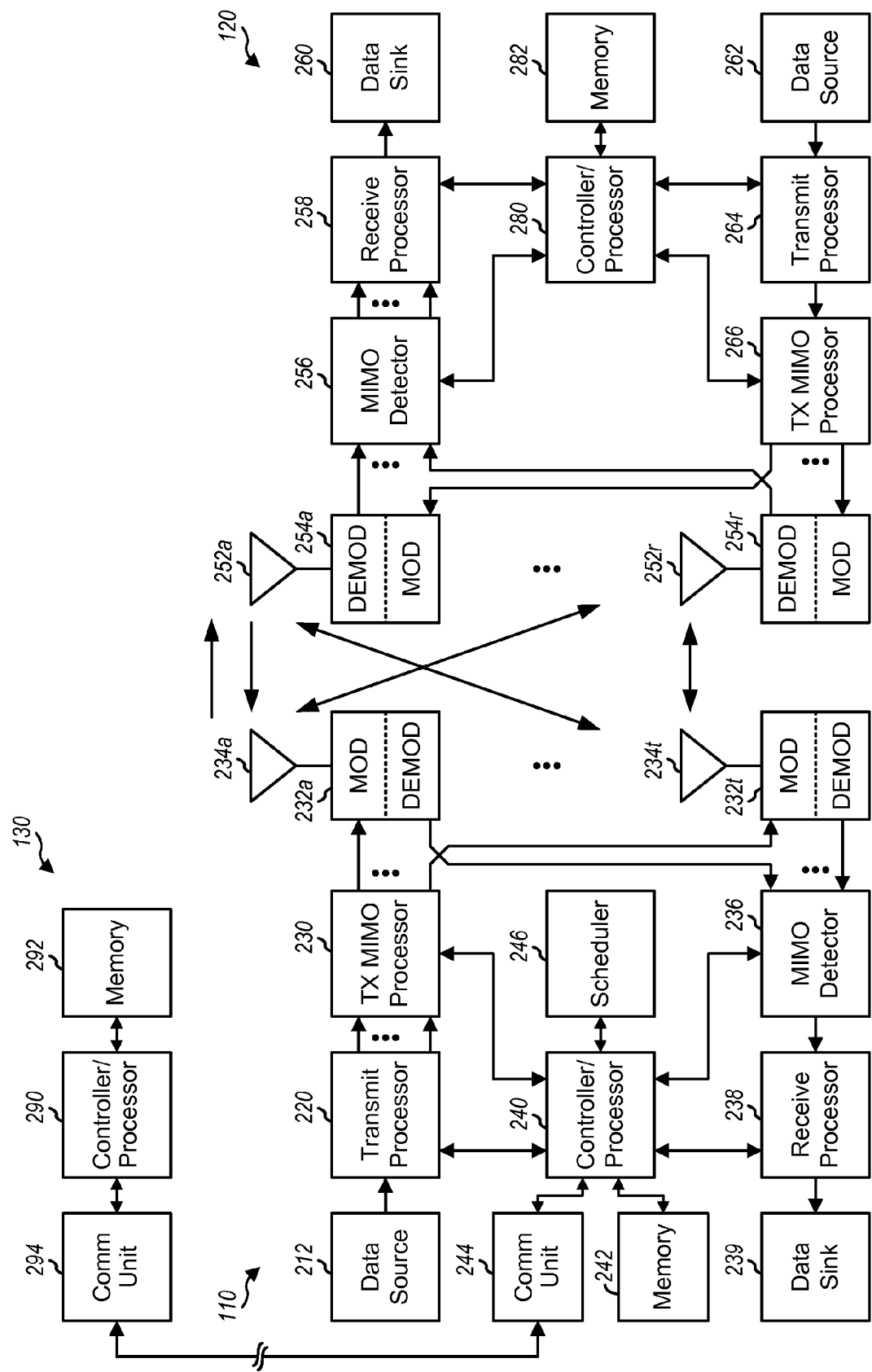
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct processes for the techniques described herein. Memories 242 and 282 may store data and program codes for base station 110 and UE 120, respectively. A scheduler 244 may schedule UEs for data transmission on the downlink and/or uplink.

As will be described in further detail below, when transmitting data to the UE 120 the base station 110 may be configured to determining a bundling size based at least in part on a data allocation size and precode data in bundled contiguous resource blocks of the determined bundling size, wherein resource blocks in each bundle are precoded with a common precoding matrix. That is, reference signals such as UE-RS and/or data in the resource blocks are precoded using the same precoder. The power level used for the UE-RS in each RB of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous resource blocks (RBs), wherein at least one reference signal in resource blocks in each bundle are precoded with a common precoding matrix, estimate at least one precoded channel based on the determined bundling size and one or more reference signals (RSs) transmitted from the base station, and decode the received bundles using the estimated precoded channel.

Figure 3:
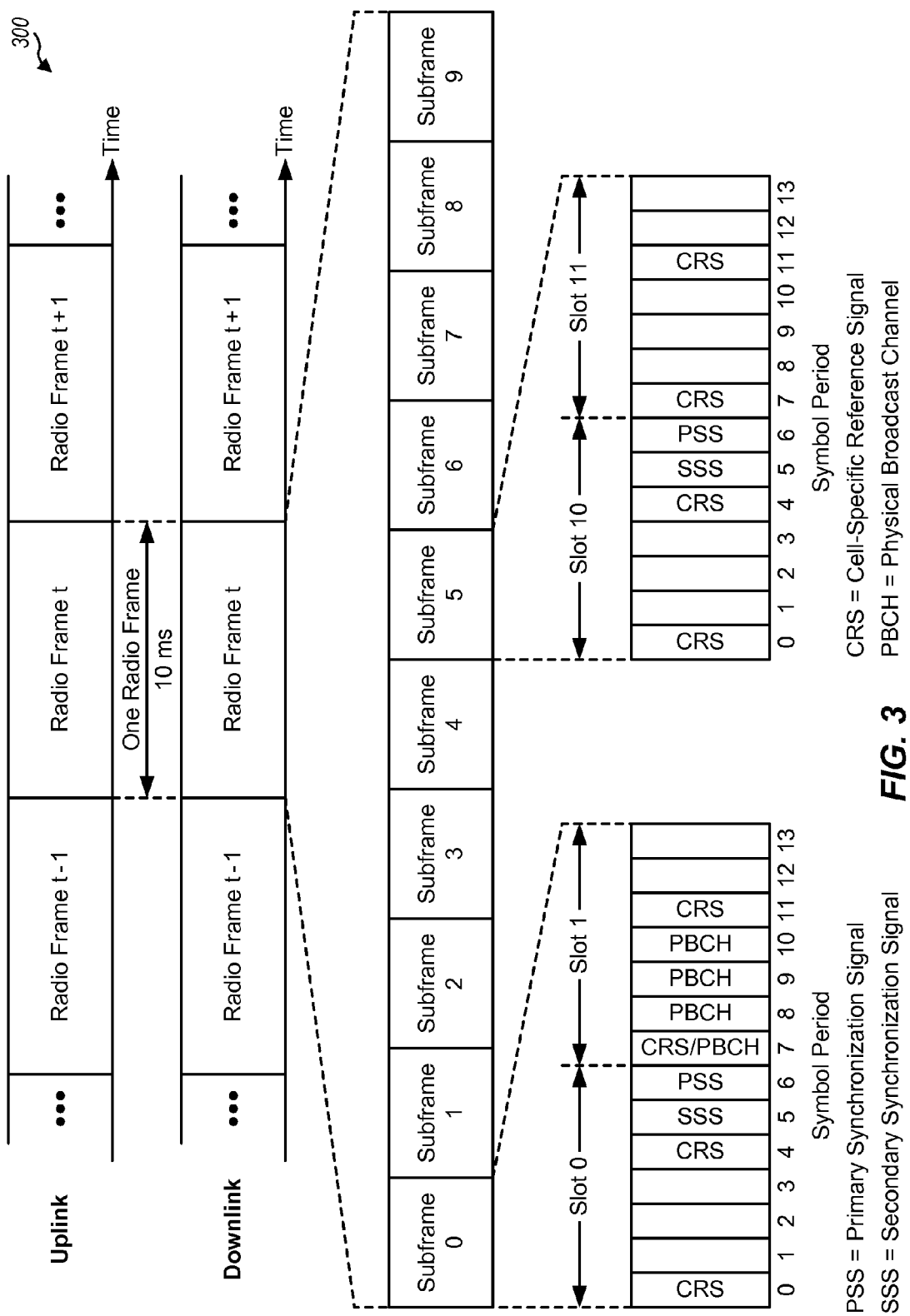
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
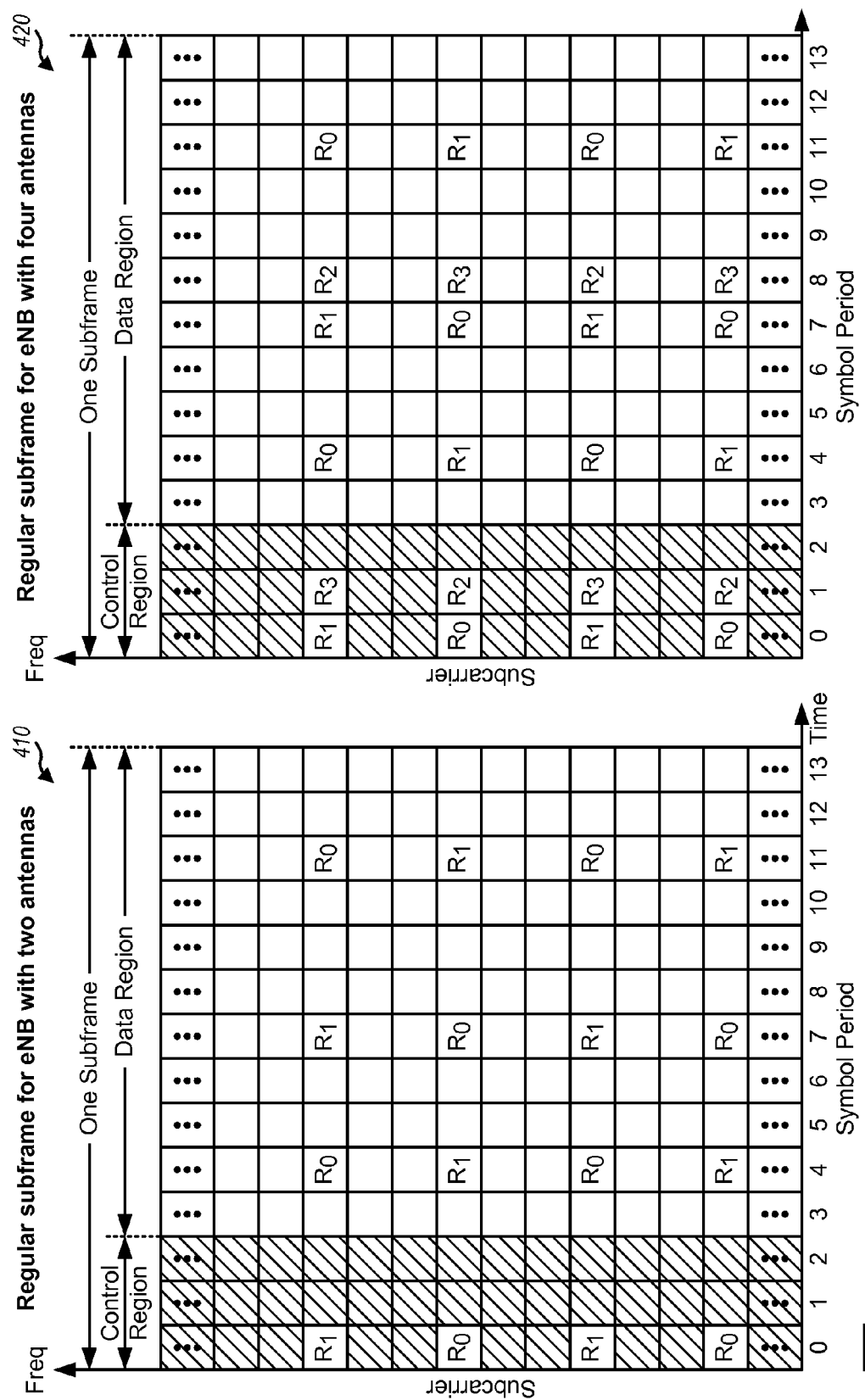
FIG. 4 illustrates two exemplary subframe formats for the downlink, in accordance with certain aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q ∈ {0, . . . , Q−1}.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Limited Duty Cycle FDD System

Acknowledgment bundling has been defined for Long Term Evolution (LTE) Time Division Duplex (TDD) systems due to asymmetric DL/UL partitioning. DL/UL partitioning may be predetermined and UE-invariant for a TDD system. In other words, a partitioning scheme may apply to all UEs in the TDD system. In the case of Frequency Division Duplex (FDD) with a limited uplink (UL) duty cycle, there may be asymmetry associated with a downlink transmission and an associated uplink acknowledgment. For example, there may be a physical downlink shared channel (PDSCH) and a physical uplink control channel (PUCCH) hybrid automatic repeat request acknowledgment (HARQ-ACK) asymmetry. Interference between downlink and uplink transmissions may be a factor contributing to the limited UL duty cycle in an FDD system. The UL duty cycle may also be limited due to interference to other communication systems. Compared to the TDD duty cycle (UE-invariant and predetermined), the FDD duty cycle may be UE-specific and may be adaptive. For an FDD system having a limited mobile transmission duty cycle, both DL and UL performance may be significantly degraded without proper mitigation techniques. According to certain embodiments of the present disclosure, various HARQ and scheduling techniques may be utilized for minimizing loss due to the limited UL duty cycle.

Figure 5:
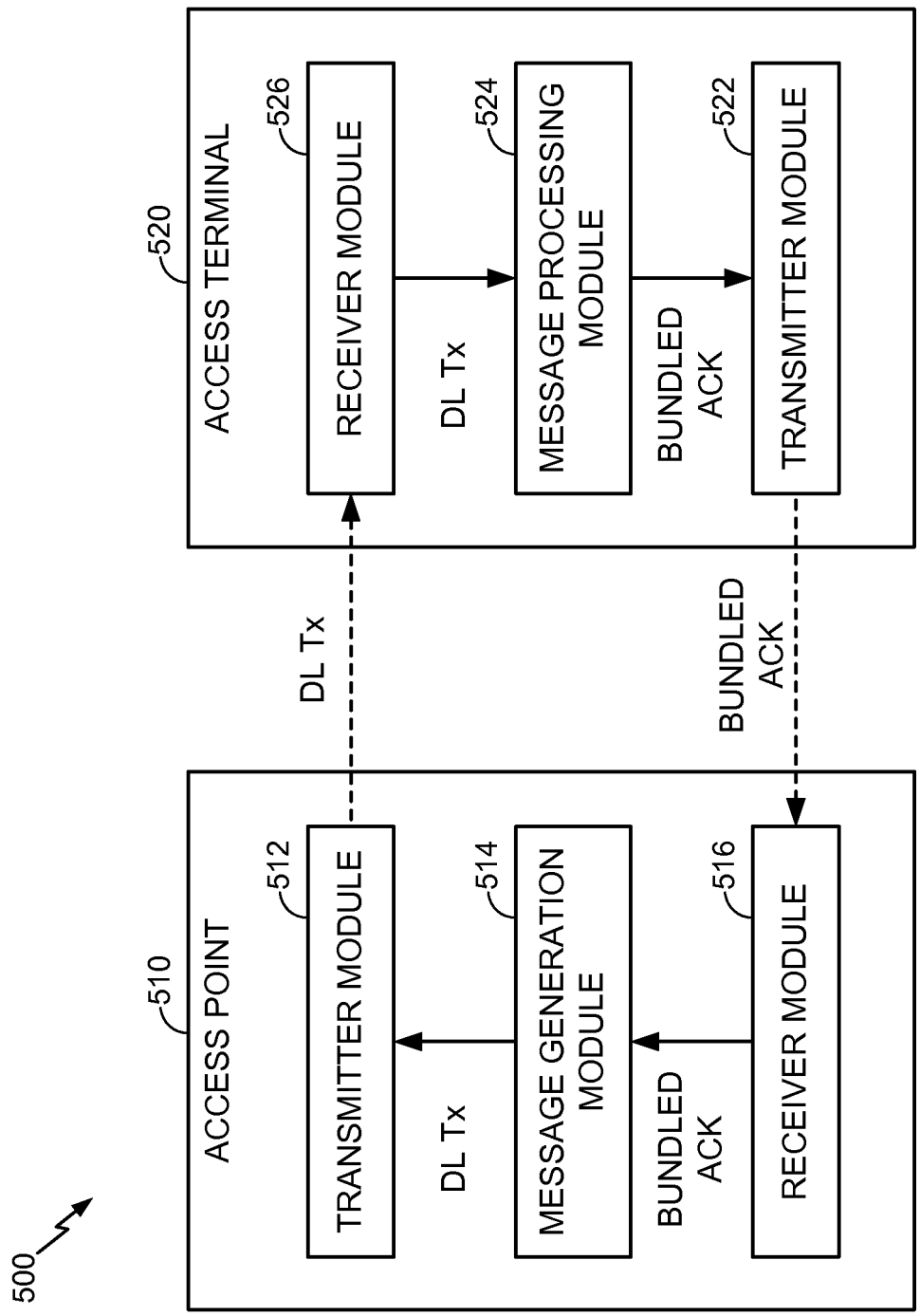
FIG. 5 illustrates an example system with an access point and an access terminal, capable of minimizing loss due to a limited UL duty cycle in a frequency division duplex (FDD) system, in accordance with certain aspects of the present disclosure.

FIG. 5 illustrates an example system 500 with an access point 510 and an access terminal 520, capable of minimizing loss due to a limited UL duty cycle in an FDD system, in accordance with certain aspects of the present disclosure. As illustrated, the access point 510 may include a message generation module 514 for generating one or more downlink transmissions (e.g., PDCCH/PDSCH/PHICH), wherein a downlink transmission may be transmitted in a downlink subframe, via a transmitter module 512, to the access terminal 520.

The access terminal 520 may receive the downlink transmission via a receiver module 526 and process the transmission via a message processing module 524. For some embodiments, the access terminal 520 may be configured transmit a bundled acknowledgment for the one or more downlink transmissions according to an uplink activity pattern, as will be discussed further herein. The access terminal 520 may be configured with the uplink activity pattern by radio resource control (RRC) signaling. For some embodiments, the access terminal 520 may transmit a bundled acknowledgment only after receiving a fixed number of downlink transmissions. After receiving and processing the one or more downlink transmissions, the access terminal 520 may construct and transmit the bundled acknowledgment, via a transmitter module 522, to the access point 510 in an uplink subframe. The access point 510 may receive the bundled acknowledgment via a receiver module 516.

Figure 6:
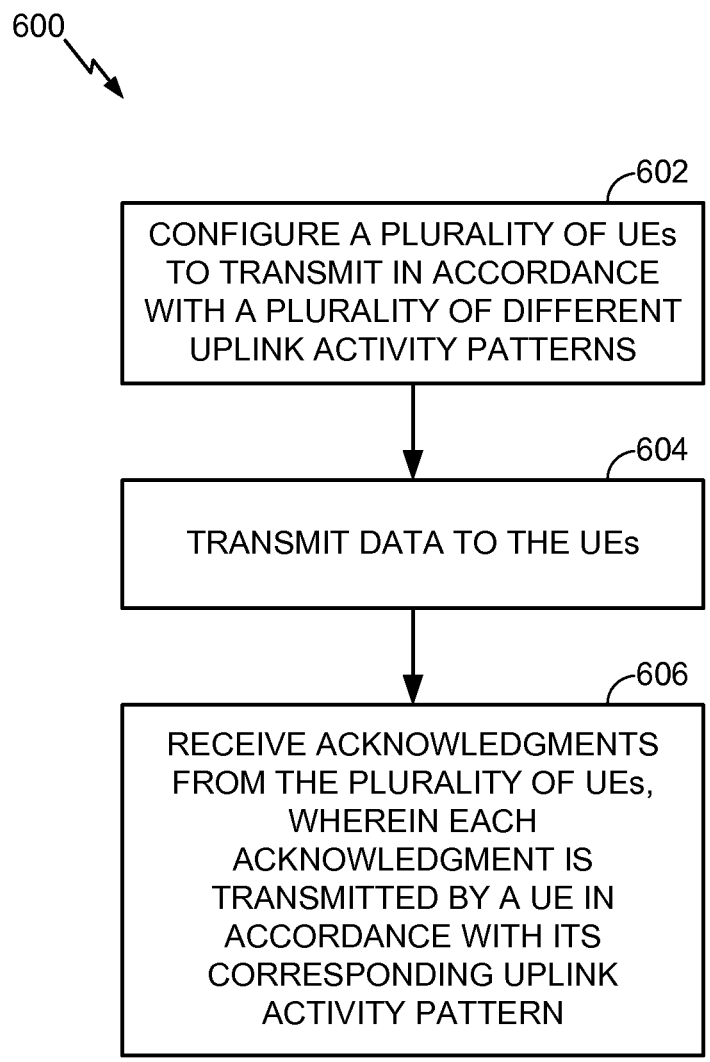
FIG. 6 illustrates example operations for configuring a plurality of UEs to different UL activity patterns, in accordance with certain aspects of the present disclosure.

FIG. 6 illustrates example operations 600 for configuring a plurality of UEs to different UL activity patterns, in accordance with certain aspects of the present disclosure. The operations 600 may be performed, for example, by an access point (e.g., BS). At 602, the BS may configure a plurality of UEs to transmit in accordance with a plurality of different uplink activity patterns. For some embodiments, the UEs may be configured with their respective uplink activity patterns by RRC signaling. The patterns may be shifted versions of a particular pattern. Different UEs may be assigned different patterns such that the overall UL activity at the BS may achieve a substantially full aggregated uplink duty cycle. For some embodiments, the different patterns may be non-overlapping.

At 604, the BS may transmit data to the UEs. A UE may activate ACK bundling based on the defined activity pattern. In other words, each UL subframe may carry ACK/NAK for one or more downlink (DL) HARQ-ACK blocks.

At 606, the BS may receive acknowledgments from the plurality of UEs, wherein each acknowledgment is transmitted by a UE in accordance with its corresponding uplink activity pattern. For example, the BS may detect the UE transmission and process the bundled ACK/NAK. For some embodiments, the data transmitted to the UEs and the acknowledgments received from the UEs may be configured such that they are not overlapping.

FIG. 7 illustrates example operations 700 for determining a fixed bundling pattern for a UE, in accordance with certain aspects of the present disclosure. The operations 700 may be performed, for example, by an access point (e.g., BS). At 702, the BS may transmit a plurality of transmissions to a UE in a plurality of downlink subframes, wherein the plurality of transmissions may comprise a predetermined number of transmissions. For some embodiments, the BS may transmit an indication of the predetermined number of transmissions to the UE (e.g., by RRC signaling).

At 704, the BS may receive a bundled acknowledgment that acknowledges receipt of the plurality of transmissions. For some embodiments, the BS may receive the bundled acknowledgment only after transmitting the predetermined number of transmissions.

FIG. 8 illustrates example operations 800 for transmitting a bundled acknowledgment for a plurality of downlink transmissions, in accordance with certain aspects of the present disclosure. The operations 800 may be performed, for example, by an access terminal (e.g., UE). At 802, the UE may receive a plurality of transmissions from a BS in a plurality of downlink subframes. At 804, the UE may transmit a bundled acknowledgment that acknowledges receipt of the plurality of transmissions. For some embodiments, the UE may transmit the bundled acknowledgment only after receiving the predetermined number of transmissions.

Figure 9:
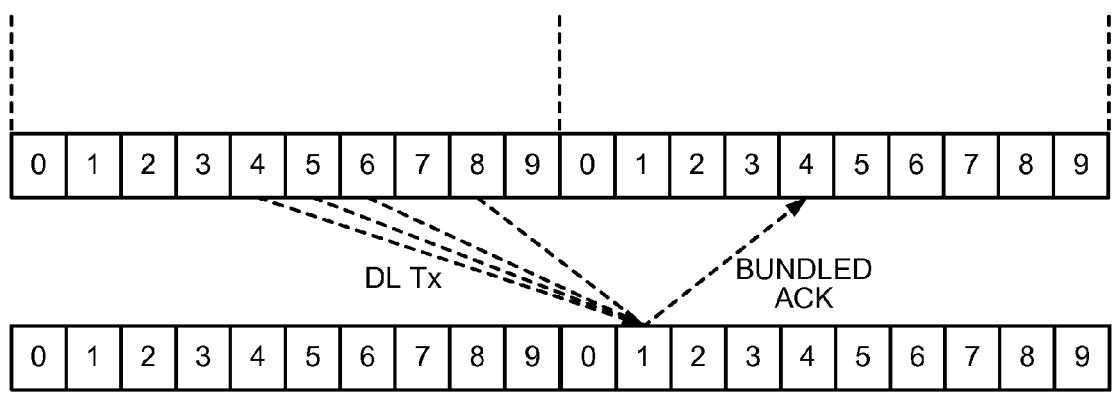
FIG. 9 illustrates an embodiment of a fixed bundling pattern for a UE, in accordance with certain aspects of the present disclosure.

FIG. 9 illustrates an embodiment of a fixed bundling pattern for a UE, in accordance with certain aspects of the present disclosure. As an example, the UE may withhold ACK/NAK transmissions for X consecutive DL transmissions (e.g., a predetermined number of transmissions). In other words, the UE may transmit an acknowledgment only after receiving the predetermined number of transmissions. In one embodiment, X may be four, such that one ACK may be sent for four subframes. As illustrated in FIG. 9, the UE may transmit a bundled acknowledgment in subframe 1, acknowledging receipt of downlink transmissions (e.g., PDCCH/PDSCH/PHIC) in subframes 4, 5, 6, and 8. In other words, the UE may transmit the bundled acknowledgment only after receiving four consecutive DL transmissions. For some embodiments, a single ACK bit may be used for all X transmissions. For other embodiments, one ACK bit may be used for each DL transmission.

For some embodiments, there may be physical uplink shared channel (PUSCH) based ACK/NAK bundling. In other words, a UE may withhold ACK/NAK transmissions until a PUSCH assignment is received by the UE. Instead of transmitting ACK/NAK on PUCCH, the UE may transmit a bundled ACK/NAK with a PUSCH transmission. For some embodiments, if there is no PUSCH transmission within Y subframes, a bundled ACK/NAK may be transmitted as described above (e.g., after X consecutive DL transmissions).

One difference from a TDD system is that the bundling of ACK/NAK may be based on an 8 ms periodicity in an FDD system. For some embodiments, a BS may ensure that all PUSCH grants trigger transmissions that do not exceed the duty cycle limit. This may be accomplished by restricting UL scheduling to coincide with ACK 'interlaces' defined by the UE-specific bundling pattern. For some embodiments, a scheduler may provide further optimizations, wherein the BS may determine if there was no DL sent for a period of time. Therefore, there may be no UL ACK (barring false alarms), so then other interlaces for PUSCH may be temporarily used if that flexibility is desired.

For some embodiments, there may be a forced ACK discontinuous transmission (DTX) without bundling. For example, there may be an L3 configured UE-specific mask that may disable sending ACK in 75% of the subframes. The UE may receive an indication that disables acknowledging one or more downlink transmissions from the BS. The BS may still utilize the other subframes but the BS may not have the benefit of HARQ feedback for those subframes. For example, the BS utilizing the other subframes may be real time traffic with no retransmissions. The BS may target greater than one transmission and ensure that some of the retransmission may get on an acknowledged SF.

In a typical FDD system, the UL transmission may lead into the receiving chain and may cause self-interference. For some embodiments, to avoid such interference, UL transmission and DL reception may be scheduled to avoid collision.

FIGS. 10A-C illustrate three embodiments of a 25% FDD system for DL and UL scheduling that may avoid self-interference, wherein the scheduling for DL and UL may not be overlapping, in accordance with certain aspects of the present disclosure. Scheduled DL transmission comprises a physical downlink control channel (PDCCH), a PDSCH and a physical hybrid ARQ indicator channel (PHICH). Scheduled UL transmission comprises an ACK/NAK, a PUSCH, and a channel quality indicator (CQI). In an LTE FDD system timeline, the UL ACK for DL transmission at subframe n may be at subframe n+4. For some embodiments, in order to reduce the self-interference problem, it may be avoided that additional DL transmissions are scheduled at subframe n+4. For example, in FIG. 10A, the UL ACK for DL transmission at subframe 0 may be at subframe 4. Therefore, in order to reduce the self-interference problem, additional DL transmissions may not be scheduled at subframe 4.

In an LTE FDD system timeline, the DL ACK for UL transmission at subframe n may be at subframe n+4. For some embodiments, in order to reduce the self-interference problem, it may be avoided that additional UL transmissions are scheduled at subframe n+4. For example, in FIG. 10B, the DL ACK for UL transmission at subframe 4 may be at subframe 8. Therefore, in order to reduce the self-interference problem, additional UL transmissions may not be scheduled at subframe 8.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for frequency division duplex (FDD) wireless communications, comprising:
    configuring a plurality of user equipments (UEs) to transmit in accordance with a plurality of different uplink activity patterns, wherein each uplink activity pattern comprises one or more uplink subframes for a UE of the plurality of UEs to use for transmitting acknowledgments;
    transmitting data to the plurality of UEs in one or more downlink subframes; and
    receiving acknowledgments from the plurality of UEs, wherein each acknowledgment is transmitted by a UE of the plurality of UEs in one of the one or more uplink subframes of its corresponding uplink activity pattern.

2. The method of claim 1, wherein the plurality of different uplink activity patterns are non-overlapping.

3. The method of claim 1, wherein the plurality of different uplink activity patterns are selected in an attempt to achieve a substantially full aggregated uplink duty cycle at a base station.

4. The method of claim 1, wherein configuring the plurality of UEs comprises transmitting an indication that disables at least one of the plurality of UEs from transmitting an acknowledgment for one or more downlink transmissions.

5. An apparatus for frequency division duplex (FDD) wireless communications, comprising:
means for configuring a plurality of user equipments (UEs) to transmit in accordance with a plurality of different uplink activity patterns, wherein each uplink activity pattern comprises one or more uplink subframes for a UE of the plurality of UEs to use for transmitting acknowledgments;
means for transmitting data to the plurality of UEs in one or more downlink subframes; and
means for receiving acknowledgments from the plurality of UEs, wherein each acknowledgment is transmitted by a UE of the plurality of UEs in one of the one or more uplink subframes of its corresponding uplink activity pattern.

6. The apparatus of claim 5, wherein the plurality of different uplink activity patterns are non-overlapping.

7. The apparatus of claim 5, wherein the plurality of different uplink activity patterns are selected in an attempt to achieve a substantially full aggregated uplink duty cycle at a base station.

8. The apparatus of claim 5, wherein the means for configuring the plurality of UEs comprises means for transmitting an indication that disables at least one of the plurality of UEs from transmitting an acknowledgment for one or more downlink transmissions.

9. An apparatus for frequency division duplex (FDD) wireless communications, comprising:
at least one processor configured to:
configure a plurality of user equipments (UEs) to transmit in accordance with a plurality of different uplink activity patterns, wherein each uplink activity pattern comprises one or more uplink subframes for a UE of the plurality of UEs to use for transmitting acknowledgments;
transmit data to the plurality of UEs in one or more downlink subframes; and
receive acknowledgments from the plurality of UEs, wherein each acknowledgment is transmitted by a UE of the plurality of UEs in one of the one or more uplink subframes of its corresponding uplink activity pattern; and
a memory coupled to the at least one processor.

10. The apparatus of claim 9, wherein the plurality of different uplink activity patterns are non-overlapping.

11. The apparatus of claim 9, wherein the plurality of different uplink activity patterns are selected in an attempt to achieve a substantially full aggregated uplink duty cycle at a base station.

12. The apparatus of claim 9, wherein the at least one processor configured to configure the plurality of UEs comprises transmitting an indication that disables at least one of the plurality of UEs from transmitting an acknowledgment for one or more downlink transmissions.

13. A computer-program product for frequency division duplex (FDD) wireless communications, comprising:
a non-transitory computer-readable medium having code for:
configuring a plurality of user equipments (UEs) to transmit in accordance with a plurality of different uplink activity patterns, wherein each uplink activity pattern comprises one or more uplink subframes for a UE of the plurality of UEs to use for transmitting acknowledgments;
transmitting data to the plurality of UEs in one or more downlink subframes; and
receiving acknowledgments from the plurality of UEs, wherein each acknowledgment is transmitted by a UE of the plurality of UEs in one of the one or more uplink subframes of its corresponding uplink activity pattern.

14. The computer-program product of claim 13, wherein the plurality of different uplink activity patterns are non-overlapping.

15. The computer-program product of claim 13, wherein the plurality of different uplink activity patterns are selected in an attempt to achieve a substantially full aggregated uplink duty cycle at a base station.

16. The computer-program product of claim 13, wherein the code for configuring the plurality of UEs comprises code for transmitting an indication that disables at least one of the plurality of UEs from transmitting an acknowledgment for one or more downlink transmissions.

17. A method for frequency division duplex (FDD) wireless communications, comprising:
transmitting a predetermined number of transmissions to a user equipment (UE) in a plurality of downlink subframes;
transmitting a signal to the UE that indicates to withhold transmitting acknowledgements until after receiving the predetermined number of transmissions; and
receiving a bundled acknowledgment that acknowledges receipt of the predetermined number of transmissions.

18. The method of claim 17, wherein receiving the bundled acknowledgment comprises receiving the bundled acknowledgment only after transmitting the predetermined number of transmissions.

19. The method of claim 17, further comprising transmitting an indication of the predetermined number of transmissions.

20. The method of claim 17, further comprising avoiding additional transmissions to the UE while receiving the bundled acknowledgment.

21. The method of claim 17, further comprising:
transmitting an assignment for a physical uplink shared channel (PUSCH); and
receiving the bundled acknowledgment in the PUSCH.

22. An apparatus for frequency division duplex (FDD) wireless communications, comprising:
means for transmitting a predetermined number of transmissions to a user equipment (UE) in a plurality of downlink subframes;
means for transmitting a signal to the UE that indicates to withhold transmitting acknowledgements until after receiving the predetermined number of transmissions; and
means for receiving a bundled acknowledgment that acknowledges receipt of the predetermined number of transmissions.

23. The apparatus of claim 22, wherein the means for receiving the bundled acknowledgment comprises means for receiving the bundled acknowledgment only after transmitting the predetermined number of transmissions.

24. The apparatus of claim 22, further comprising means for transmitting an indication of the predetermined number of transmissions.

25. The apparatus of claim 22, further comprising means for avoiding additional transmissions to the UE while receiving the bundled acknowledgment.

26. The apparatus of claim 22, further comprising:
means for transmitting an assignment for a physical uplink shared channel (PUSCH); and
means for receiving the bundled acknowledgment in the PUSCH.

27. An apparatus for frequency division duplex (FDD) wireless communications, comprising:
at least one processor configured to:
transmit a predetermined number of transmissions to a user equipment (UE) in a plurality of downlink subframes;
transmit a signal to the UE that indicates to withhold transmitting acknowledgments until after receiving the predetermined number of transmissions; and
receive a bundled acknowledgment that acknowledges receipt of the predetermined number of transmissions; and
a memory coupled to the at least one processor.

28. The apparatus of claim 27, wherein the at least one processor configured to receive the bundled acknowledgment comprises receiving the bundled acknowledgment only after transmitting the predetermined number of transmissions.

29. The apparatus of claim 27, wherein the at least one processor is configured to transmit an indication of the predetermined number of transmissions.

30. The apparatus of claim 27, wherein the at least one processor is configured to avoid additional transmissions to the UE while receiving the bundled acknowledgment.

31. The apparatus of claim 27, wherein the at least one processor is configured to:
transmit an assignment for a physical uplink shared channel (PUSCH); and
receive the bundled acknowledgment in the PUSCH.

32. A computer-program product for frequency division duplex (FDD) wireless communications, comprising:
a non-transitory computer-readable medium having code for:
transmitting a predetermined number of transmissions to a user equipment (UE) in a plurality of downlink subframes;
transmitting a signal to the UE that indicates to withhold transmitting acknowledgements until after receiving the predetermined number of transmissions; and
receiving a bundled acknowledgment that acknowledges receipt of the predetermined number of transmissions.

33. The computer-program product of claim 32, wherein the code for receiving the bundled acknowledgment comprises code for receiving the bundled acknowledgment only after transmitting the predetermined number of transmissions.

34. The computer-program product of claim 32, further comprising code for transmitting an indication of the predetermined number of transmissions.

35. The computer-program product of claim 32, further comprising code for avoiding additional transmissions to the UE while receiving the bundled acknowledgment.

36. The computer-program product of claim 32, further comprising code for:
transmitting an assignment for a physical uplink shared channel (PUSCH); and
receiving the bundled acknowledgment in the PUSCH.

37. A method for frequency division duplex (FDD) wireless communications, comprising:
receiving a predetermined number of transmissions from a base station in a plurality of downlink subframes;
receiving a signal that indicates to withhold transmitting acknowledgments until after receiving the predetermined number of transmissions; and
transmitting a bundled acknowledgment that acknowledges receipt of the predetermined number of transmissions.

38. The method of claim 37, wherein transmitting the bundled acknowledgment comprises transmitting the bundled acknowledgment only after receiving the predetermined number of transmissions.

39. The method of claim 37, further comprising receiving an indication of the predetermined number of transmissions.

40. The method of claim 37, further comprising avoiding uplink transmissions while receiving the plurality of transmissions from the base station.

41. The method of claim 37, further comprising receiving an indication that disables acknowledging one or more downlink transmissions from the base station.

42. The method of claim 37, further comprising:
receiving an assignment for a physical uplink shared channel (PUSCH); and
transmitting the bundled acknowledgment in the PUSCH.

43. The method of claim 42, wherein the bundled acknowledgment is not transmitted until receiving the assignment for the PUSCH.

44. An apparatus for frequency division duplex (FDD) wireless communications, comprising:
means for receiving a predetermined number of transmissions from a base station in a plurality of downlink subframes;
means for receiving a signal that indicates to withhold transmitting acknowledgments until after receiving the predetermined number of transmissions; and
means for transmitting a bundled acknowledgment that acknowledges receipt of the predetermined number of transmissions.

45. The apparatus of claim 44, wherein the means for transmitting the bundled acknowledgment comprises means for transmitting the bundled acknowledgment only after receiving the predetermined number of transmissions.

46. The apparatus of claim 44, further comprising means for receiving an indication of the predetermined number of transmissions.

47. The apparatus of claim 44, further comprising means for avoiding uplink transmissions while receiving the plurality of transmissions from the base station.

48. The apparatus of claim 44, further comprising means for receiving an indication that disables acknowledging one or more downlink transmissions from the base station.

49. The apparatus of claim 44, further comprising:
means for receiving an assignment for a physical uplink shared channel (PUSCH); and
means for transmitting the bundled acknowledgment in the PUSCH.

50. The apparatus of claim 49, wherein the bundled acknowledgment is not transmitted until receiving the assignment for the PUSCH.

51. An apparatus for frequency division duplex (FDD) wireless communications, comprising:
at least one processor configured to:
receive a predetermined number of transmissions from a base station in a plurality of downlink subframes;
receive a signal that indicates to withhold transmitting acknowledgments until after receiving the predetermined number of transmissions; and
transmit a bundled acknowledgment that acknowledges receipt of the predetermined number of transmissions; and
a memory coupled to the at least one processor.

52. The apparatus of claim 51, wherein the at least one processor configured to transmit the bundled acknowledgment comprises transmitting the bundled acknowledgment only after receiving the predetermined number of transmissions.

53. The apparatus of claim 51, wherein the at least one processor is configured to receive an indication of the predetermined number of transmissions.

54. The apparatus of claim 51, wherein the at least one processor is configured to avoid uplink transmissions while receiving the plurality of transmissions from the base station.

55. The apparatus of claim 51, wherein the at least one processor is configured to receive an indication that disables acknowledging one or more downlink transmissions from the base station.

56. The apparatus of claim 51, wherein the at least one processor is configured to:
receive an assignment for a physical uplink shared channel (PUSCH); and
transmit the bundled acknowledgment in the PUSCH.

57. The apparatus of claim 56, wherein the bundled acknowledgment is not transmitted until receiving the assignment for the PUSCH.

58. A computer-program product for frequency division duplex (FDD) wireless communications, comprising:
a non-transitory computer-readable medium having code for:
receiving a predetermined number of transmissions from a base station in a plurality of downlink subframes;
receiving a signal that indicates to withhold transmitting acknowledgments until after receiving the predetermined number of transmissions; and
transmitting a bundled acknowledgment that acknowledges receipt of the predetermined number of transmissions.

59. The computer-program product of claim 58, wherein the code for transmitting the bundled acknowledgment comprises code for transmitting the bundled acknowledgment only after receiving the predetermined number of transmissions.

60. The computer-program product of claim 58, further comprising code for receiving an indication of the predetermined number of transmissions.

61. The computer-program product of claim 58, further comprising code for avoiding uplink transmissions while receiving the plurality of transmissions from the base station.

62. The computer-program product of claim 58, further comprising code for receiving an indication that disables acknowledging one or more downlink transmissions from the base station.

63. The computer-program product of claim 58, further comprising code for:
receiving an assignment for a physical uplink shared channel (PUSCH); and
transmitting the bundled acknowledgment in the PUSCH.

64. The computer-program product of claim 63, wherein the bundled acknowledgment is not transmitted until receiving the assignment for the PUSCH.

65. The method of claim 1, wherein the one or more downlink subframes do not overlap the one or more uplink subframes.

66. The apparatus of claim 5, wherein the one or more downlink subframes do not overlap the one or more uplink subframes.

67. The apparatus of claim 9, wherein the one or more downlink subframes do not overlap the one or more uplink subframes.

68. The computer-program product of claim 13, wherein the one or more downlink subframes do not overlap the one or more uplink subframes.

* * * * *